Oct. 23, 1962   F. B. ROBB   3,059,945
SPLASH GUARD CONTROL MEANS
Filed Dec. 3, 1959

INVENTOR.
F. B. ROBB
BY Robb & Robb
attorneys

3,059,945
SPLASH GUARD CONTROL MEANS
Frank B. Robb, Mayfield Heights, Ohio, assignor to Truck and Trailer Products, Inc., Cleveland, Ohio, a corporation
Filed Dec. 3, 1959, Ser. No. 856,996
7 Claims. (Cl. 280—154.5)

This invention relates to vehicle splash guard construction, and more particularly to means adapted to be used in conjunction therewith, whereby undesired swinging movement of the splash guard is obviated, such swinging movement being known as sailing.

Vehicle splash guards are commonly used in conjunction with trucks and trailers, being mounted adjacent the rear wheels thereof, so as to reduce and under some conditions eliminate backward splash caused by movement of the wheels in wet weather, such splash commonly impinging upon the windshields of vehicles following the truck or trailer as the case may be.

Such vehicle splash guards as are commonly used, may be made of flexible material such as some rubber compound or other flexible material which is not affected adversely to an unnecessarily great extent by weather conditions whether freezing, wet or otherwise.

The splash guards with which the instant invention is intended to be associated, are usually mounted fairly near the rear most wheels of a truck or trailer, so as to depend downwardly from the under portion of the body or chassis and made of sufficiently heavy material so that under most conditions the splash guard hangs more or less vertically.

In view of the fact that the splash guards of the nature herein described are commonly caused to flap, when the vehicle is moving, particularly in windy or other conditions and when rain or snow is being thrown backwardly by forward movement of the vehicle, it is desirable to prevent such backward movement so that the efficiency of the splash guard is maintained, and to the foregoing end, the instant invention is directed.

The invention hereof comprises the bracket unit which is arranged to be associated with a commonly mounted splash guard, so as to prevent the backward movement of the splash guard to an undesired extent and thus obviate the splashing on vehicles following.

The invention contemplates the provision of a suitable means comprising a transverse member positioned along the rear face of the splash guard and having a pair of forwardly extending members which are affixed to the underside of a vehicle, the transverse member thereby preventing rearward motion of the lower portion of the flap, since such member is located at that position and maintained in such position by a pair of vertically extending rods which are located along the outer face of the flap and as such operate to maintain the transverse member in its proper location. The transverse member is maintained in the proper position as before stated, and in addition the body of the splash guard at intermediate positions between the mounting thereof and the transverse member is restrained from undesired bulging by the vertcially extending members which are connected both to the mounting of the splash guard and the transverse member aforesaid.

The member hereof is likewise intended to prevent other motion of the splash guard forwardly by the provision of an additional transverse member along the inner face of the flap for such purpose.

In view of the foregoing, the objects of this invention will be understood as being directed to a means for preventing both rearward movement of the splash guard or the like to any undesired extent, additionally providing for increased efficiency as a splash preventing member, the unit of the invention being devised so as to be readily attached and detached from a truck or vehicle or the like.

A specific object of the invention is to provide a splash guard restraining member which positions a splash guard vertically and in most respects maintains the same in a substantially vertical plane by the provision of suitable and novel means therefor.

Further and more specific objects of the invention will be understood from a consideration of the specification appended hereto and shown in the drawings wherein.

Figure 1:
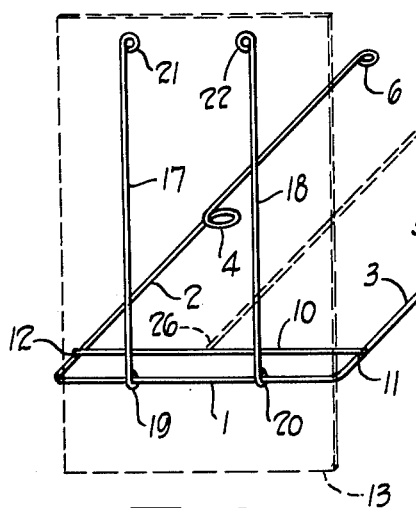
FIGURE 1 is a perspective view showing the bracket unit of the invention in its position simulating that which it occupies when installed, the outline of the splash guard being indicated in dotted lines.

Referring now to the drawings, the invention hereof is disclosed as comprising a bracket constructed in its preferred form of rod of relatively small diameter including a transverse member 1 and a pair of arms 2 and 3 integral therewith and extending therefrom so as to form a generally U-shaped member.

The arms 2 and 3 are formed with loops 4 and 5 respectively therein, substantially midway between the connections of the arms 2 and 3 and the transverse member 1.

Figure 2:
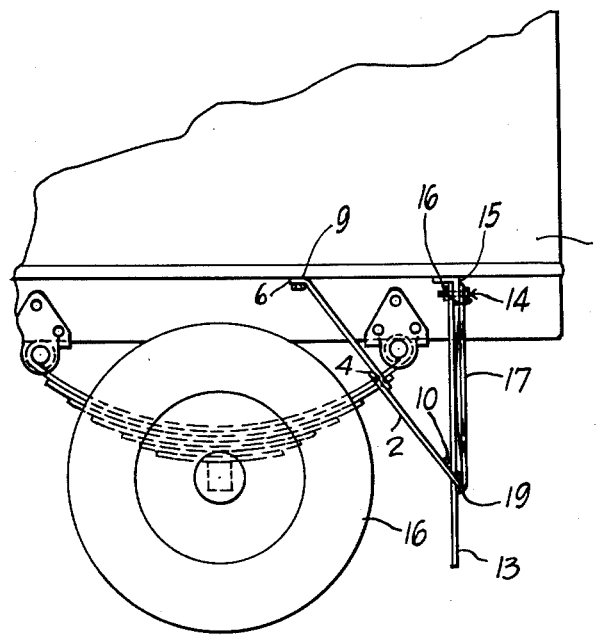
FIGURE 2 is a side elevational view, somewhat fragmentary, illustrating the bracket as it is installed.

The arms 2 and 3 are further equipped at their extremities with loops such as 6 and 7, these loops 6 and 7 providing for positioning suitable mounting bolts or screws as the case may be in a manner to be subsequently explained or as shown in FIGURE 2 bent slightly at an angle and welded or otherwise secured to the underside of the chassis or body 8 denoted at 9 for example.

Extending transversely and about parallel with the transverse member 1 is a further transverse member 10 which is spot welded or otherwise secured at 11 and 12 to the arms 3 and 2 respectively, being spaced somewhat from the transverse member 1 so as to receive therebetween the flap which as shown in FIGURE 2 is designated 13, and mounted by mounting bolts 14 at the upper end thereof to a downwardly extending transverse metal part 15.

Figure 3:
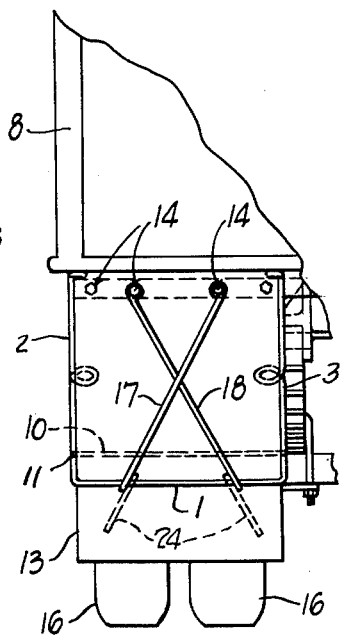
FIGURE 3 is a rear view, showing the bracket installed and is likewise a somewhat fragmentary view.

The splash guard or flap 13 as it is more commonly called, is usually constructed of a molded rubber composition in the form of a sheet-like member approximately one quarter of an inch thick and of a width sufficiently great to extend from side to side of dual tires such as illustrated in FIGURE 3 and denoted 16, the dual wheels and tires 16 being commonly provided for supporting the rear portions of trucks or trailers or the like.

As indicated in FIGURE 3, the mounting bolts 14 are provided, usually four in number, and equipped with nuts 16 so as to secure the splash guard 13 thereto.

The splash guard 13 as will be readily appreciated, under ordinary conditions where it does not have any restraining means engaged therewith, will during the course of forward movement of the truck as supported by the wheels and tires 16, tend to move rearwardly at its lowermost extremity at the very least and as such permit the backward splash which is desired to be controlled by the device hereof.

As shown in FIGURE 2 therefor, the device is mounted so as to extend at an angle with regard to the underside of the body and likewise the splash guard 13, down to the lower extremity or nearly so of the splash guard 13 and in order to maintain the same in position it is desirable to provide for some arms such as 17 and 18, to position such lower extremity of the bracket so to speak.

The arms 17 and 18 are preferably denoted parts to distinguish the same from the arms 2 and 3 previously referred to, and such parts 17 and 18 are formed of similar material to that of the rest of the bracket, being connected at the lower ends 19 and 20 so as to be swingable with regard to and mounted on the transverse member 1. This is shown more particularly in FIGURE 2 and consist of loops formed around the transverse member 1 on the lower ends of each of the parts 17 and 18.

The parts 17 and 18 are provided at the upper extremities with other loops 21 and 22, which are intended to be engaged beneath the heads 16 of the mounting bolts 14 and thus the parts 17 and 18 are maintained in the proper position and thereby the bracket unit as a whole is similarly maintained.

As illustrated in FIGURE 3 the parts 17 and 18 may be crossed so as to provide additional rigidity and stability of the bracket unit as a whole.

The loops 4 and 5 previously referred to are formed in the arms 2 and 3, to provide, for instances when the transverse member 1 strikes an obstruction if the truck or trailer is backed rearwardly, and to prevent serious damage to the unit as a whole.

Figure 4:
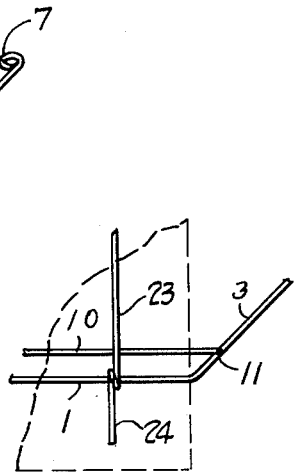
FIGURE 4 is a fragmentary view in perspective, showing a modified form of bracket.

As illustrated in FIGURE 4 a modified form of the parts 17 and 18 is disclosed, there being one of these parts shown in FIGURE 4 and denoted 23, such part being substantially like the parts 17 and 18, but on its lower extremity the loop is extended downwardly. A further portion 24 is thereby provided, which will minimizez rearward motion of the lowest extremity of the flap as will be readily understood from a consideration of this figure. All other elements of the bracket as a whole may remain the same and of course if desired the part 23 may be crossed over a similar part and the condition illustrated by the dotted line extensions in FIGURE 3 and denoted 24 similarly will be established.

Whereas a transverse rod 10 is shown as being located near the transverse member 1, it is not necessarily compulsory that it be so positioned. If the member 10 is located farther toward the loops 6 and 7, on the arms 2 and 3, substantial rigidity is provided in the device as a whole.

As indicated in FIGURE 1, in lieu of providing the pair of arms 2 and 3, a single arm indicated in dotted lines and denoted 25 may be furnished, said arm being fastened in any preferred way at 26 to the transverse member 10, as by welding or even by suitably looping the rod 25 around the transverse member 10.

It is of course also understood that in lieu of having the pair of vertical parts 17 and 18, a single such part may be provided to carry out the function of positioning the transverse member 1, preventing undue movement of the central portion of the splash guard.

I claim:

1. In splash guard construction of the class described, in combination, a splash guard suspended from a vehicle in a substantially vertical position, said splash guard being of flexible construction and subject to movement by air currents, means to connect the guard to such vehicle, means to connect the guard to the vehicle, and separate means to limit rearward swinging movement of said guard and stiffen the same, comprising a transverse member positioned along the face of said guard to provide lateral stiffness and an arm extending forwardly ahead of the means to connect the guard to the vehicle and connected with such vehicle.

2. The combination as claimed in claim 1, wherein a pair of arms extend forwardly from the transverse member for connection to such vehicle, and a pair of vertical parts extend from the connecting means to the transverse member along the outer face of the guard to limit rearward bending movement thereof.

3. The combination as claimed in claim 1, wherein means are provided to limit rearward bending movement of the guard comprising at least one rod-like part extending from the connecting means to the transverse member, and mounted in rear of the same along said rear.

4. In splash guard construction of the class described, in combination, a flexible splash guard suspended from a vehicle, means to connect the guard to the vehicle, a generally U-shaped separable bracket having a transverse member positioned along the rear face of the guard, and a pair of arms connected thereto and extending forwardly to points of connection with the body of such vehicle separate from and well in advance of the connecting means for the guard.

5. The combination as claimed in claim 4, wherein a second transverse member is positioned along the inner face of the guard and connected to the arms aforesaid.

6. The combination as claimed in claim 4, wherein at least one vertical part extends upwardly from the transverse member and operates as a limiting means to maintain the transverse member in position.

7. The combination as claimed in claim 6, wherein the vertical part extends along the rear face of the guard to the connecting means whereby to minimize rearward bending movement of the portion of the guard intermediate said transverse member and the connecting means for said guard.

References Cited in the file of this patent

UNITED STATES PATENTS

| | | |
|---|---|---|
| 508,782 | Taintor | Nov. 14, 1893 |
| 1,476,602 | Duncan | Dec. 4, 1923 |
| 1,754,147 | Cookson | Apr. 8, 1930 |
| 1,807,039 | Keizer | May 26, 1931 |
| 1,904,342 | Zaiger et al. | Apr. 8, 1933 |
| 2,546,781 | Rheeling | Mar. 27, 1951 |
| 2,836,914 | Nelson et al. | June 3, 1958 |
| 2,896,968 | Bodnaruk | July 28, 1959 |

FOREIGN PATENTS

| | | |
|---|---|---|
| 311,273 | Germany | Mar. 8, 1919 |